United States Patent
Dalstam et al.

(10) Patent No.: US 10,716,401 B2
(45) Date of Patent: Jul. 21, 2020

(54) ATTACHMENT ARRANGEMENT AND PIECE OF FURNITURE

(71) Applicant: IKEA SUPPLY AG, Pratteln (CH)

(72) Inventors: Robert Dalstam, Karlshamn (SE); Mikael Carlsson, Växjö (SE)

(73) Assignee: IKEA Supply AG, Pratteln (CH)

( * ) Notice: Subject to any disclaimer, the term of this patent is extended or adjusted under 35 U.S.C. 154(b) by 15 days.

(21) Appl. No.: 16/062,544

(22) PCT Filed: Dec. 14, 2016

(86) PCT No.: PCT/SE2016/051257
§ 371 (c)(1),
(2) Date: Jun. 14, 2018

(87) PCT Pub. No.: WO2017/105324
PCT Pub. Date: Jun. 22, 2017

(65) Prior Publication Data
US 2018/0368575 A1    Dec. 27, 2018

(30) Foreign Application Priority Data

Dec. 16, 2015  (SE) ...................................... 1551662

(51) Int. Cl.
*F16B 12/00*        (2006.01)
*A47B 96/06*        (2006.01)
(Continued)

(52) U.S. Cl.
CPC .......... *A47B 96/068* (2013.01); *A47B 96/066* (2013.01); *F16B 12/24* (2013.01); *F16B 12/46* (2013.01)

(58) Field of Classification Search
CPC ..... H01L 24/29; H01L 21/6836; H01L 24/27; C09J 11/06
(Continued)

(56) References Cited

U.S. PATENT DOCUMENTS 3,695,655 A   10/1972   Wippermann
4,089,614 A    5/1978   Harley
(Continued)

FOREIGN PATENT DOCUMENTS

AT         413256 B      1/2006
CN      104039199 A      9/2014
(Continued)

OTHER PUBLICATIONS

Search Report for European Search Report for European Patent Application No. 16876149.2, dated Jun. 11, 2019.
(Continued)

*Primary Examiner* — Steven M Marsh
(74) *Attorney, Agent, or Firm* — Merchant & Gould P.C.

(57) ABSTRACT

The disclosure relates to an attachment arrangement adapted to connect a first furniture part to a second furniture part. The attachment arrangement comprises a first attachment part adapted to be inserted into a recess in said first furniture part along a first axis, and a second attachment part adapted to be inserted into a recess in said second furniture part by a relative motion along a second axis. The second attachment part comprises at least one elongated ridge having a length and a height extending in a ridge plane, the ridge plane having a normal forming an angle to the first axis, which angle is smaller than 30°, wherein said at least one elongated ridge is formed on top and/or side surfaces of the second attachment part. The disclosure also relates to a piece of furniture comprising a first furniture part, a second furniture part and an attachment arrangement.

23 Claims, 13 Drawing Sheets

(51) Int. Cl.
*F16B 12/24* (2006.01)
*F16B 12/46* (2006.01)

(58) Field of Classification Search
USPC .............. 248/220.21, 220.22; 403/292, 375
See application file for complete search history.

(56) References Cited

U.S. PATENT DOCUMENTS

| | | | |
|---|---|---|---|
| 4,639,161 A * | 1/1987 | Mazaki | F16B 12/20 403/231 |
| 5,359,944 A * | 11/1994 | Steinbeck | A47B 13/08 403/294 |
| 5,468,109 A | 11/1995 | Ferrari et al. | |
| 5,499,886 A * | 3/1996 | Short | A47B 95/043 403/381 |
| 6,659,677 B1 | 12/2003 | Exposito | |
| 2013/0287484 A1 | 10/2013 | Phillips | |
| 2014/0205373 A1 | 7/2014 | Anderson et al. | |

FOREIGN PATENT DOCUMENTS

| | | |
|---|---|---|
| CN | 104768422 A | 7/2015 |
| DE | 7223449 U | 6/1973 |
| DE | 2361284 A1 | 6/1975 |
| DE | 2557966 A1 | 6/1977 |
| DE | 20312613 U1 | 11/2003 |
| DK | 128131 B | 3/1974 |
| DK | 112197 A | 3/1999 |
| EP | 1081392 A2 | 3/2001 |
| EP | 1178225 A1 | 2/2002 |
| EP | 2792274 A1 | 10/2014 |
| EP | 2792274 B1 | 2/2016 |
| JP | 54107515 U | 7/1979 |
| WO | WO 02/35103 A1 | 5/2002 |
| WO | 2015/181301 A1 | 12/2015 |

OTHER PUBLICATIONS

International-Type Search Report for Swedish Patent Application No. 1551662-8, dated Aug. 29, 2016.
International Search Report and Written Opinion for PCT/SE2016/051257 dated Mar. 15, 2017.
Chinese Office Action for corresponding CN Application No. 201680079476.6 dated Sep. 18, 2019 (translation enclosed), 19 pages.

* cited by examiner

ATTACHMENT ARRANGEMENT AND PIECE OF FURNITURE

This application is a National Stage Application of PCT/SE2016/051257, filed 14 Dec. 2016, which claims the benefit of priority to Swedish Patent Application No. 1551662-8, filed 16 Dec. 2015, which applications are incorporated herein by reference. To the extent appropriate, a claim of priority is made to each of the above disclosed applications.

FIELD OF INVENTION

The invention relates to an attachment arrangement adapted to connect a first furniture part to a second furniture part. The attachment arrangement comprises: a first attachment part adapted to be inserted into a recess in said first furniture part by a relative motion between the first attachment part and the first furniture part in a first insertion direction extending along a first axis, and a second attachment part adapted to be inserted into a recess in said second furniture part by a relative motion between on one hand the second furniture part and on the other hand the attachment arrangement in a second insertion direction extending along a second axis, the second axis having at least a major component orthogonal to the first axis.

The invention also relates to a piece of furniture comprising a first furniture part, a second furniture part and an attachment arrangement.

TECHNICAL BACKGROUND

It is known to have separate attachment arrangements adapted to connect furniture parts to each other. One such example is used in book shelves to connect the shelves to the two opposing side walls of the book shelf. The inside surfaces of the two side walls are provided with a plurality of holes. Four pins (forming attachment arrangements) are inserted into the holes on corresponding heights such that a part of respective pin is exposed and extends inwardly from the inside surface of the respective side wall. The shelf is then installed from above such that it rests on the exposed parts of the pins. The shelf may be provided with recesses formed in the underside of the shelf to prevent the shelf from sliding out from the bookshelf.

When designing attachment arrangements, the designer balance a number of different design criteria, such as manufacturing costs, user-friendliness, stability and strength.

SUMMARY OF INVENTION

It is an object of the invention to provide an improved attachment arrangement. The improvement may relate to one or more of the above mentioned design criteria and/or to other design criteria mentioned in the description or otherwise associated with the usefulness of an attachment arrangement, typically for the connection of a first furniture part to a second furniture part.

This object has been achieved by an attachment arrangement which is of the kind indicated in the introductory part of the description wherein the second attachment part comprises at least one elongated ridge having a length and a height and extending in a ridge plane, wherein the ridge plane has a normal forming an angle to the first axis, which angle is smaller than 30°, wherein said at least one elongated ridge is formed on top and/or side surfaces of the second attachment part, which top surface is adapted to face the second furniture part and which side surfaces are adapted to extend from the top surface in a direction having a component which is parallel with the second insertion direction, and wherein the first attachment part is configured to be inserted into the recess in said first furniture part allowing the second attachment part to maintain its orientation about the first axis during the insertion the first attachment part in the recess, and preferably also during the provision of the locking effect between the first attachment part and the recess.

It may be noted that the second axis has at least a major component orthogonal to the first axis. The first axis may extend at an angle $\gamma$ relative to the imaginary direction in which the first axis and second axis are orthogonal to each other. This angle $\gamma$ may be a small angle e.g. taking into account that, when the second furniture part is loaded, the first attachment part may have a tendency to move inside or deform the inside of the recess thereby slightly changing the orientation of the attachment arrangement relative to the first furniture part. The angle $\gamma$ may e.g. be chosen such that when the first and second furniture parts are attached to each other, the longitudinal extension of the first attachment part becomes orthogonal to the loading direction. The loading direction is typically parallel to the second direction. The angle $\gamma$ may be chosen to be up to 45° to take into account a design of a furniture with furniture parts being connected in non-orthogonal relative motions. It is considered appropriate that the second axis has at least a major component orthogonal to the first axis to provide the desired locking effect between the first and second furniture parts.

It may be noted that the angle (which may be composed of the angles $\beta$ and $\beta'$) being smaller than 30° may be used to provide an angle $\beta$ in the plane defined by the first and second directions and an angle $\beta'$ in a plane formed by the first direction and a third direction being orthogonal to the first and second directions.

The angle $\beta$ may e.g. be used to provide a locking effect in the sense that the ridges will have a tendency to decrease the angle $\beta$ when the second furniture part is installed, which decrease in angle $\beta$ may be used to lock the first attachment part inside the recess of the first furniture part.

The angle $\beta'$ may e.g. be used to provide a pressing force onto the second furniture part relative to the first furniture part along a third direction being orthogonal to the first and second directions. This may e.g. be useful if the first part is provided with a shoulder portion extending along the first direction and it is desired that the second furniture part is pressed against the first furniture part both in the first direction and also in the third direction into abutment with the shoulder portion. The same could be desirable if the first furniture part is provided with or attached to a third furniture part, such as a back side of a cupboard or the like, whereby it could be desirable to have the second furniture abutting the third furniture part.

It may be noted that the angle between the first direction and the normal may be composed completely of the angle $\beta$ or alternatively completely by the angle $\beta'$ or by a combination of the angles $\beta$ and $\beta'$.

The fact that the first attachment part is configured to be inserted into the recess in said first furniture part allowing the second attachment part to maintain its orientation about the first axis during the insertion of the first attachment part in the recess provides the advantage that the second attachment part will be oriented in the desired direction and be ready to interact with the second furniture part. This allowing the second attachment part to maintain its orientation about the first axis may according to the preferred embodiments be provided by the first attachment part being rotatable relative to the second attachment part. An example of this is e.g. shown in FIGS. 7-8. This allowing the second attachment part to maintain its orientation about the first axis may also be provided by designing the first attachment part such that it may be inserted in any rotational orientation and still provide the desired locking effect in the interaction with the recess of the first furniture part. Examples of this latter is e.g. shown in FIGS. 5-6 and 9-23. Another advantage of allowing the second attachment part to maintain its orientation about the first axis during the insertion of the first attachment part in the recess is that it is possible to achieve full insertion and of the first attachment part and abutment between the second attachment part and the first furniture part and still provide correct orientation of the second attachment part.

By designing the attachment part with elongated ridges oriented at an angle with its extension with a major component perpendicular to the first axis the ridges may transfer forces preventing relative motion between the attachment arrangement and the second furniture part along the first axis. By preventing relative movement along the first axis, the second furniture part, such as a shelf, may be used to hold the first furniture part, such as a sidewall of a bookshelf, in a desired position. For example, one shelf connected at its respective corners using respective attachment arrangements of the kind disclosed may be used to prevent the sidewall from bulging outwardly. The elongated ridge with its orientation also has the advantage that the ridge is easy to position correctly in the recess in the second furniture part. If the user inadvertently slides the second furniture part, e.g. the shelf, while the surface and not an intended an attachment recess is resting on the second part of the attachment arrangement, the extension of the ridge makes it possible to design it such that it provides a comparably large resting surface which minimises the risk of inadvertently damaging the underside of the second furniture part during such sliding motion. The fact that the ridge is elongated also opens up for the possibility to design it to act as a wedge to provide a strong and secure connection in the attachment recess of the second furniture part. The fact that the ridge is elongated and oriented in the mentioned orientation also opens up for the possibility to design it such that it, during the relative motion between the second furniture part and the second part of the attachment arrangement, guides the second furniture part into correct position. Thus, it is not important for the user to position the second furniture part in the exact position before the movement along second insertion direction is initiated.

According to one preferred embodiment, the attachment arrangement is used to secure shelves to the sidewalls in a bookshelf, a wardrobe, cupboard, or the like. In such an application, the sidewall of the bookshelf is typically the first furniture part and the shelf is typically the second furniture part. The inside surface of the sidewall is typically provided with one or more recesses, such as drilled holes, extending in the first direction, said first direction being normal to the inside surface of the side wall. The first insertion direction is, hence, typically normal to the inside surface of the side wall, extends in a horizontal plane and is directed towards the surface of the side wall. The second direction is in the bookshelf application typically directed vertically downwardly. In such an application, a ridge plane is typically vertically oriented.

The second insertion direction is according to one embodiment parallel with the direction of gravity force, i.e. directed vertically downwards. This will make the mounting easier, and will assist in holding the second furniture part in place.

It may be noted that the attachment arrangement may be used for different kinds of applications where the orientation of e.g. the second direction or the ridge plane relative to gravity may be different than in the typical bookshelf application.

It may be noted that it is in many cases preferred that the recess in the second furniture part does not extend all the way through the material. In the bookshelf application this means that the shelf may be provided with a smooth upper surface. It may be noted that it is possible to design the second furniture part such that the recess extends all the way through the material. It may be noted that in such a case, the feature "which top surface is adapted to face the second furniture part" is intended to be understood as the situation just before the second part of the attachment arrangement has been inserted into the recess in the second furniture part. In the first case above where the recess does not extend all the way through the second furniture part, the top surface will face the second furniture part both before and after being inserted into the recess; before insertion the top surface will face the second furniture part as such and after insertion the top surface will face the inside surface of the recess of the second furniture part.

Preferred embodiments appear in the dependent claims and in the description.

The first attachment part may comprise an elongate member extending along the first axis, wherein the elongate member is insertable into said recess in said first furniture part by said relative motion between the first attachment part and the first furniture part in the first insertion direction in order to interact with an inside surface of the recess. This relative motion may be provided by screwing the first attachment part into the recess of the first furniture part. The relative motion may be provided by translational motion of the first attachment part into the recess of the first furniture part.

The second attachment part is allowed to maintain its orientation about the first axis e.g. by the elongate member being oriented relative the second attachment part and/or provided with protrusions extending across the first axis such that an angle different from orthogonal is formed between the normal and the second axis when the elongate member is inserted into the recess in the first furniture part and whereby installation of the second furniture part forces the elongate member to deform inside walls of the recess in the first furniture part such that the angle between the normal and the second axis comes closer to orthogonal when both the first and second furniture parts are installed, and/or e.g. by the second attachment part being provided with a body having a through-going hole adapted to receive a screw or pin.

The elongate member may be oriented relative the second attachment part and/or provided with protrusions extending across the first axis such that an angle of between 0.5-10°, preferably between 4-8°, different from orthogonal is formed between the normal and the second axis when the elongate member is inserted into the recess in the first furniture part and whereby installation of the second furniture part forces the elongate member to deform inside walls of the recess in the first furniture part such that the angle between the normal and the second axis comes closer to orthogonal when both the first and second furniture part are installed. This provides a strong locking effect preventing the elongate member from accidentally being pulled out of the recess in the first furniture part. In the preferred embodiment, the angle is between 5-7°.

In one embodiment the elongate member is oriented relative to the second attachment part at an angle of between 0.5-10°, preferably between 4-8°, and most preferably between 5-7° such that, when the when the elongate member is inserted into the recess in the first furniture part, an angle of between 0.5-10°, preferably between 4-8°, less than orthogonal is formed between the normal and the second axis. The elongate member is provided with protrusions adapted to interact with the inside surface of the recess. The protrusions may be continuous or semi-continuous circular protrusions (as shown e.g. in FIGS. 17-23), protrusions extending upwardly and opposing protrusions extending downwardly (as e.g. shown in FIGS. 5-6) or threads around the stem of the elongate member.

The elongate member may be fixedly attached to the second attachment part. This may be provided by forming the attachment arrangement in a single piece of material, such as a polymeric material or metallic material. This may alternatively be provided by separate manufacture of the elongate member and then fixedly attaching it to the second attachment part. This latter may e.g. be performed by placing a pre-manufactured elongate part in a mould in which the second attachment part is moulded, thereby moulding a portion of the first attachment part into the second attachment part.

The second attachment part may be provided with a body having a through-going hole adapted to receive a screw, which screw is adapted to interact, preferably threadingly interact, with an inside surface of the recess and with the body and to thereby force the body into abutment with the first furniture part thereby attaching the attachment arrangement to the first furniture part. With such a design the fact that the screw is screwed into the recess in the first furniture part provides a strong locking effect preventing the attachment arrangement from being removed from the first furniture part.

The attachment arrangement may be provided with a lower support member adapted to abut the second furniture part, preferably to abut a lower surface of the second furniture part, thereby aiding said at least one elongated ridge to support the second furniture part relative to the first furniture part. This is advantageous since the lower support member will transfer load onto a portion of the second furniture part having full thickness not affected by the presence of a recess adapted to receive the second attachment part. Thereby the second furniture part may be designed with limited thickness and still be able to withstand great loads.

The attachment arrangement may be provided with a cover plate adapted to cover the recess in the second furniture part when the attachment arrangement is inserted into the recess of the second furniture part. The lower support member may be formed as a cover plate adapted to cover the recess in the second furniture part when the attachment arrangement is inserted into the recess of the second furniture part.

The second attachment part may preferably comprise a plurality of consecutive elongate ridges, wherein each elongate ridge has a length and height arranged in an associated ridge plane, wherein each such ridge plane has a normal forming an angle to the first axis, which angle is smaller than 30°, and wherein the ridge planes are arranged successively one after another along the first axis, whereby along the first axis there is formed a set of consecutive ridges being separated by valleys arranged therebetween. A plurality of consecutive elongated ridges oriented in this manner may provide a strong force along the first axis with relatively low ridge heights which may be useful e.g. when the second furniture part has a comparably low height, such as a shelf.

It may be noted that the ridge planes need not be parallel to each other. It is also conceivable that a single ridge follows a first ridge plane on one side of the second attachment part and another ridge plane (forming an angle with the first ridge plane) on the other side, thereby forming a V-shaped elongation (as seen in a plane to which the second axis is a normal). This may apply both for single ridge case and for a case with a plurality of consecutive ridges.

The ridge planes associated with respective ridge of said plurality of said consecutive elongate ridges may be parallel to each other. This is facilitates e.g. manufacturing of the attachment arrangement.

Each ridge plane may have a normal forming an angle $\beta'$, $\beta$ to the first axis, which angle $\beta'$, $\beta$ is smaller than 10°, and which angle $\beta$ in a horizontal plane preferably is 0°. A small angle $\beta$ in a vertical plane is advantageous when it comes to provide a strong holding force along the first axis. An angle $\beta$ of 0° in a horizontal plane is advantageous since it facilitates the provision of symmetrical design. It e.g. makes it possible to provide symmetric forces on the different sides of a shelf with the use of identical attachment arrangements on all four corners.

Each ridge may, as seen in a plane perpendicular to the ridge plane, have a wedge shaped cross-section with its width decreasing with increasing height. Such a shape is strong and also provides an automatic guiding effect as the user starts to move the second furniture part into engagement with the second attachment part.

Each ridge may have a length such that a projection of the length onto a plane to which the second axis forms a normal is larger than, and preferably at least two times larger than, a maximum width of the ridge as seen along the first axis. This provides a distinct locking force along the first axis and still makes it possible to design the ridge with limited height, which in turn has an advantage in that it is possible to design the second furniture part with limited height and an advantage in that each ridge may be strong against shear forces along the first axis.

Each ridge may have a length such that a projection of the length onto a plane to which the second axis forms a normal is larger than, and preferably at least two times larger than, a maximum height of the ridge. This provides a distinct locking force along the first axis and still makes it possible to design the ridge with limited height, which in turn has an advantage in that it is possible to design the second furniture part with limited height and an advantage in that each ridge may be strong against shear forces along the first axis.

The side surfaces may be adapted to extend from the top surface in a direction having a component perpendicular to the second axis, the distance between the side surfaces increasing with increased distance from the top surface. This way the second attachment part will have a wedge effect guiding the second furniture part into correct position as the second furniture part is moved into engagement with the second attachment part.

Each ridge may have along its length, in the ridge plane, a crest running along a curved or wedge shaped line such that a, along the length, a central portion of the crest is located at a greater height than both side portions of the crest located, along the length, on either sides of the central portion. Such a design makes good use of the available surface providing a strong locking effect along the first axis and also provides a guiding effect not only associated with the shape of the side surfaces but also associated with the shape of respective ridge.

The second part of the attachment arrangement may comprise a body part having a portion of its surface being adapted to face the second furniture part and being formed as a convexly curved, preferably formed as a circular cylindrical, portion with its central axis extending along the normal direction, and with said at least one ridge running circumferentially on said convexly curved, preferably circular, cylindrical, portion. This is a design which provides a strong locking effect along the first axis, provides a distinct guiding effect, makes good use of the available surface and which also addresses the risk of the user damaging the second furniture part.

The first attachment part may comprise a pin, which pin is fixedly attached to the second attachment part, which pin extends along the first axis, and which pin is insertable into said recess in said first furniture part by said relative motion between the first attachment part and the first furniture part in the first insertion direction in order to interact with an inside surface of the recess. The pin may be integrally formed with the second attachment part and of the same material. The attachment arrangement may e.g. be formed of a plastic material or of a metallic material. One suitable metallic material is e.g. Zamac. One suitable grade is e.g. Zamac 5. A suitable material may accordingly be a zinc-based alloy comprising about 94-96% zinc, about 3-5% aluminium, and optionally about 0.5-1.5% copper.

The pin may also be of another material (such as a metal pin, preferably a steel pin) moulded into a plastic body forming at least the second attachment part of the attachment arrangement. The pin may also be added at a later stage. In such a case the second attachment part may be provided with a body having a through-going hole adapted to receive a pin.

The pin may be oriented relative the second attachment part and/or provided with protrusions extending across the first axis such that an angle of between 0.5-10°, preferably between 4-8°, different from orthogonal is formed between the normal of the ridge plane and the second axis when the pin is inserted into the recess in the first furniture part and whereby installation of the second furniture part forces the pin to deform inside walls of the recess in the first furniture part such that the angle between the normal and the second axis comes closer to orthogonal when both the first and second furniture part are installed. This provides a strong locking effect preventing the pin from accidentally being pulled out of the recess in the first furniture part. In the preferred embodiment, the angle is between 5-7°.

The through-going hole and the there-through extending pin or screw may be complemented with guiding pins adapted to extend into the recess into which the first attachment part is adapted to extend or into other holes in the first furniture part separate from the recess. The guiding pins may e.g. be two or more tongues extending in parallel in the first direction with the pin or screw being adapted to extend between the tongues. The tongues may e.g. act as a plug frictionally engaging with the inside surface of the recess when a screw is screwed into the recess between the tongues or when a pin is forced through the through-going hole and between the tongues. This latter design is e.g. useful if the first furniture part is formed of comparably soft material, such as fibre board or the like. As mentioned above the screw or pin may engage directly with the inside surface of the recess.

The pin may be provided with one or more protrusions extending at least partly across the first axis and being adapted to interact with an inside surface of the recess, the protrusions thereby forming barbs counter-acting removal of the attachment arrangement from the first furniture part.

The protrusions or barbs may extend around a part of the circumference of the pin, or be discrete and distributed completely, as rings, around the circumference of the pin thereby counter-acting removal once the pin has been inserted into the recess.

In one preferred embodiment, the pin is, on a portion adapted to be located deeper inside the recess, provided with one or more protrusions or barbs located on only a part of the circumference of the pin being adapted to face a direction opposite the second insertion direction, and is, on a portion adapted to be located closer to the mouth of the recess, provided with one or more protrusions or barbs located only on a part of the circumference of the pin being adapted to face along the second insertion direction. With this latter design, the pin will be forced into a locked position counter-acting removal when the second furniture part is installed and also when the second furniture is loaded in the second direction, e.g. by supporting books, whereas the pin may still easily be removed during dismantling of the furniture. This latter may e.g. be useful if the user desires to change the vertical position of a shelf.

Another objective is to provide a piece of furniture comprising a first and a second furniture part and which are connectable to each other. This is provided with a piece of furniture comprising a first furniture part, a second furniture part and an attachment arrangement according to any embodiment disclosed above or to any embodiment disclosed in the description as a whole.

The second furniture part may be provided with an attachment recess having at least one elongate valley extending in a valley plane being parallel to the associated ridge plane of the second attachment part, the respective valley being adapted to interact with an associated ridge of the attachment arrangement thereby counteracting relative motion between the attachment arrangement and the second furniture part along the first axis.

Said at least one ridge of the attachment arrangement may be adapted to be positioned relative to the position of said at least one valley of the second furniture part and relative the position of an abutment portion of the attachment arrangement by which the attachment arrangement abuts the first furniture part such that the second furniture part is forced into interference fit along the first axis as the second attachment part and the second furniture part are moved towards each other along the second insertion direction. This provides a distinct effect of stabilising the first and second furniture parts relative to each other.

This may alternatively be expressed as that a ridge plane associated with a valley plane is located closer to the first furniture part when the attachment arrangement is positioned relative the first furniture part and the second furniture part is in initial abutment with the first furniture part but not fully moved towards the attachment arrangement. Thereby the further or final movement of the second furniture part towards the attachment part will cause the ridge plane and valley plane to move towards each other and typically ultimately coincide and the second furniture part being forced into interference fit with the first furniture part.

The attachment recess and the second attachment part may be adapted for, during mounting, to cause a sliding-in movement of said at least one ridge of the attachment arrangement into said at least one valley of the attachment recess of the second furniture part to cause the second furniture part to be pressed against the first furniture part during mounting, such that said interference fit is achieved.

In a preferred embodiment the second furniture part is provided with an attachment recess having a plurality of consecutive elongate valleys each extending in a valley plane being parallel to the associated ridge plane, the respective valley being adapted to interact with an associated ridge of the attachment arrangement thereby counteracting relative motion between the attachment arrangement and the second furniture part along the first axis. The valleys of the recess in the second furniture part may form along the first axis a set of consecutive valleys being separated by ridges arranged therebetween. In a preferred embodiment the valleys are complementary in shape to the ridges on the second attachment part of the attachment arrangement.

The attachment recess may be provided with a waist separating an entrance part of the attachment recess from a locking part of the attachment recess, preferably the second attachment part being adapted for passing the waist upon being pressed thereagainst, the waist being adapted for holding the second attachment part locked in the locking part in accordance with snap-action function, as the waist has a more narrow cross-section, to be passed by the second attachment part, than the locking part. This provides a distinct information to the user concerning correct attachment and it also aids in keeping the shelf in place.

According to one aspect the invention may also in short be said to relate to an attachment arrangement adapted to connect a first furniture part to a second furniture part, wherein the attachment arrangement comprises a first attachment part adapted to be inserted into a recess in said first furniture part along a first axis, and a second attachment part adapted to be inserted into a recess in said second furniture part by a relative motion along a second axis, and wherein the second attachment part comprises at least one elongated ridge having a length and a height extending in a ridge plane, the ridge plane having a normal forming an angle to the first axis, which angle is smaller than 30°, wherein said at least one elongated ridge is formed on top and/or side surfaces of the second attachment part.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
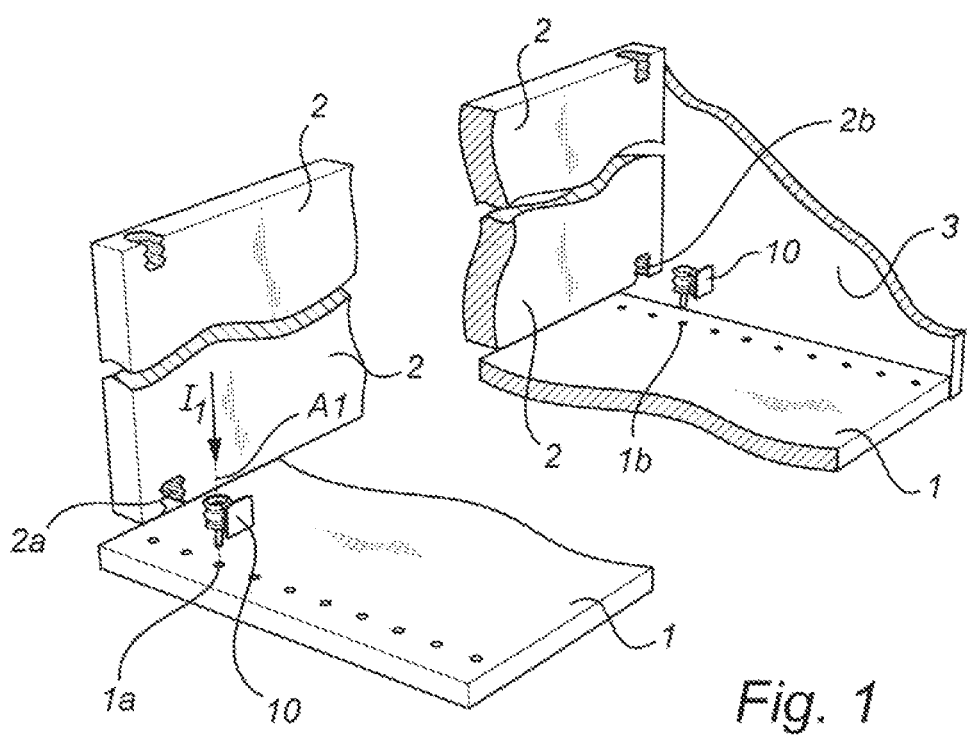
FIG. 1 shows a cupboard or bookshelf laid on a side wall with the self extending upwardly in a state before any of the parts are assembled.
Figure 2:
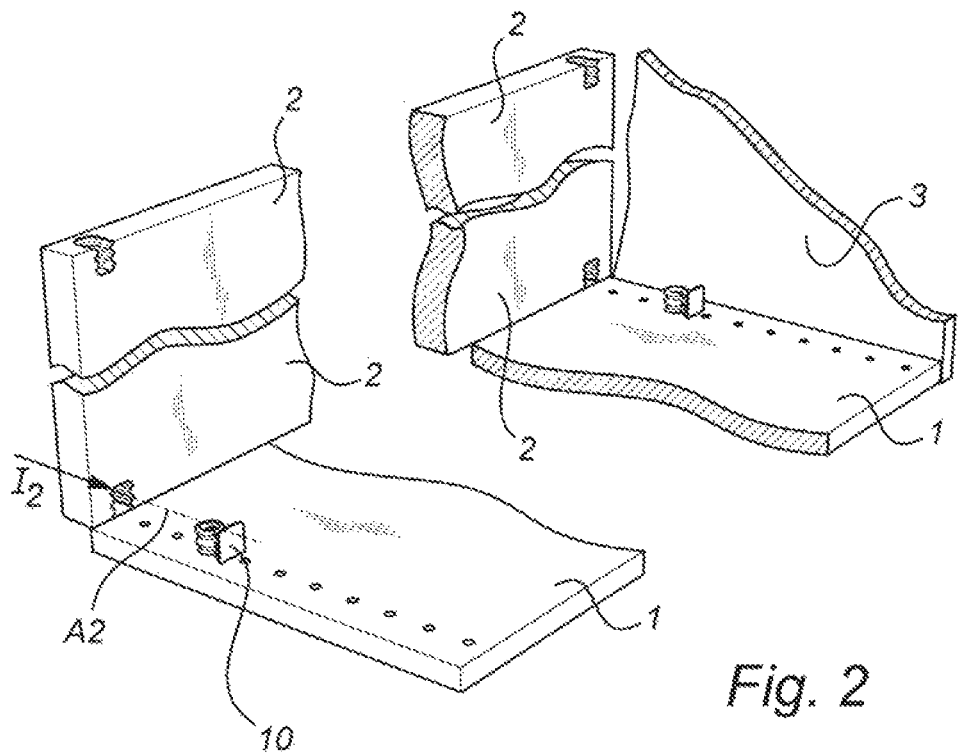
FIG. 2 corresponds to FIG. 1 and shows a state where the attachment arrangements are inserted into the recesses of the inside surface of the side wall.
Figure 2B:
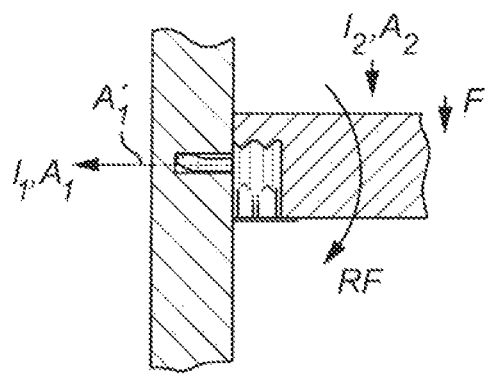
FIG. 2b is a cross-section corresponding to FIG. 2.
Figure 2C:
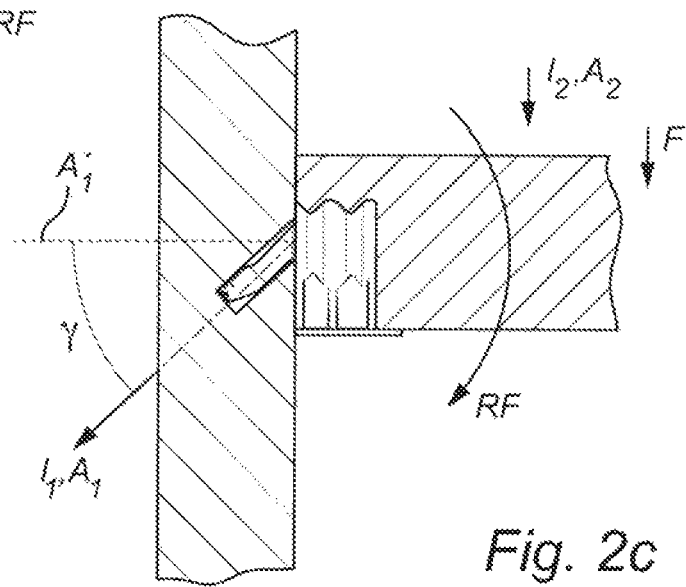
FIG. 2c is a cross-section of an another embodiment.
Figure 3:
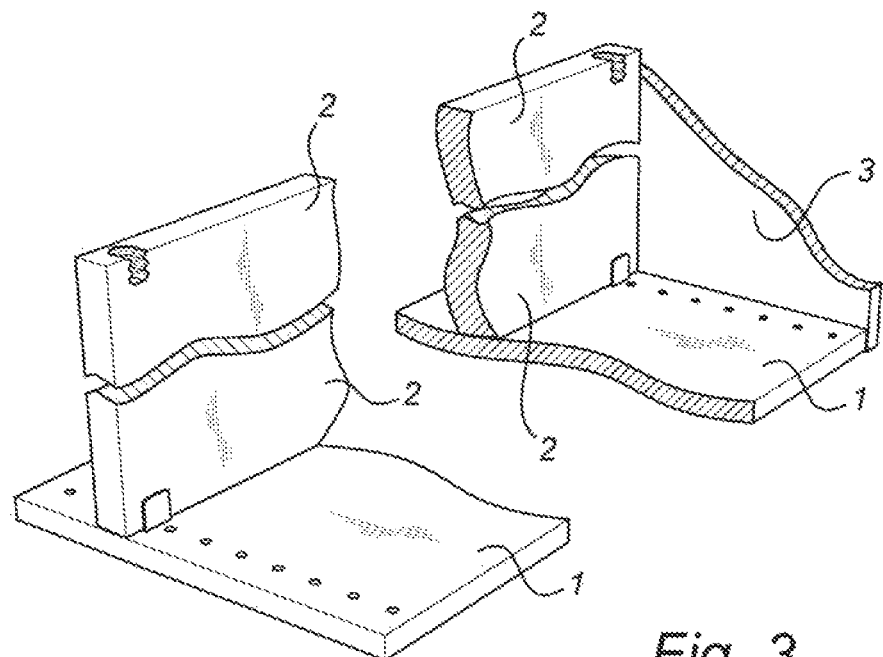
FIG. 3 corresponds to FIGS. 1 and 2 and shows an assembled state with the shelf moved into position onto the attachment arrangement.

In FIGS. 1-3, there is disclosed an attachment arrangement 10 adapted to connect a first furniture part 1 to a second furniture part 2. As shown in more detail e.g. in FIG. 5, the attachment arrangement comprises: a first attachment part 11 adapted to be inserted into a recess 1a, 1b (FIG. 1) in said first furniture part 1 by a relative motion between the first attachment part 11 and the first furniture part 1 in a first insertion direction $I_1$ extending along a first axis A1, and a second attachment part 22 adapted to be inserted into a recess 2a, 2b in said second furniture part 2 by a relative motion between on one hand the second furniture part 2 and on the other hand the attachment arrangement 22 in a second insertion direction $I_2$ extending along a second axis A2. In its widest implication the second axis A2 has at least a major component orthogonal to the first axis A1. In the preferred embodiment the first axis A1 is orthogonal to the second axis A2 (as e.g. shown in FIGS. 1, 2 and 2b). In FIG. 2c there is shown a design where the first axis A1 extends at an angle γ relative to an imaginary direction (indicated by the dashed line A1') along which imaginary direction the first axis $A_1$ would be orthogonal to the second axis $A_2$. This angle γ may be a small angle e.g. taking into account that, when the second furniture part 2 is loaded (indicated by arrow F), the first attachment part 11 may have a tendency to move inside or deform the inside of the recess 1a thereby slightly changing the orientation of the attachment arrangement 10 relative to the first furniture part (indicated by arrow RF). The angle γ may e.g. be chosen such that when the first and second furniture parts 1, 2 are attached to each other, the longitudinal extension of the first attachment part 11 becomes orthogonal to the loading direction F. The angle γ may be chosen to be up to 45° to take into account a design of a furniture with furniture parts 1, 2 being connected in non-orthogonal relative motions.

Figure 4:
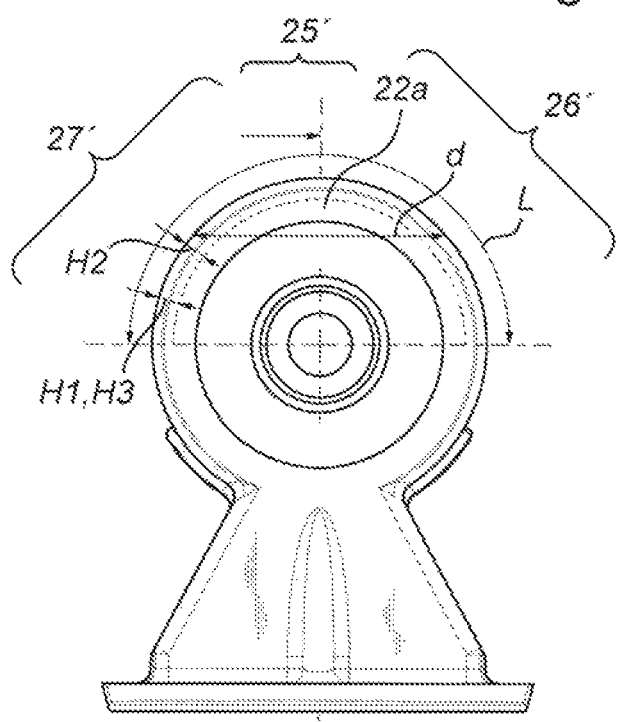
FIGS. 4-6 show an attachment arrangement according to a first embodiment.
Figure 5:
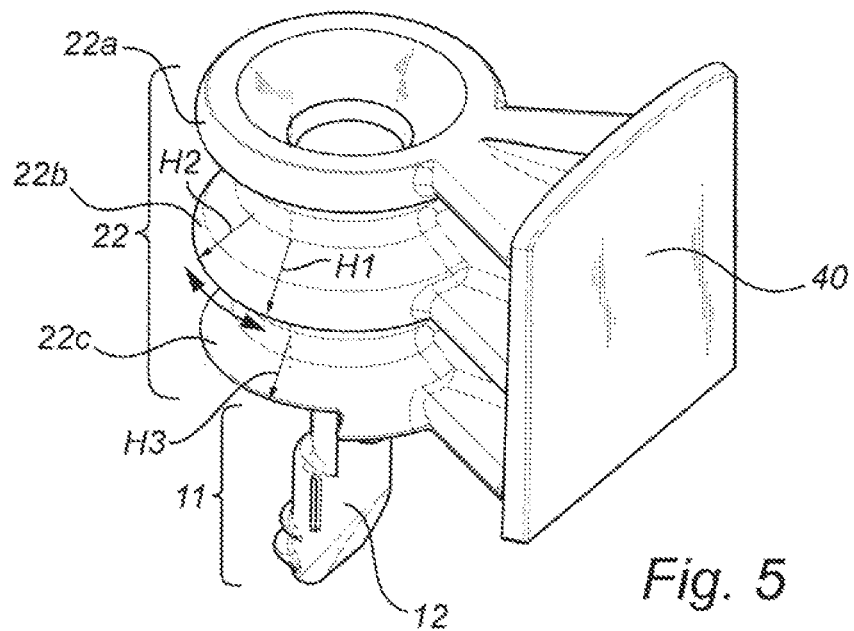

As shown e.g. in FIG. 5, the second attachment part 2 comprises a plurality of consecutive elongated ridges 22a-c, wherein each elongate ridge has a length L (see FIG. 4) and a height H extending in an associated ridge plane PR1, PR2, PR3. The ridge planes PR1, PR2, PR3 are arranged successively one after another along the first axis A1, whereby along the first axis A1 there is formed a set of consecutive ridges 22a-c being separated by valleys 23a-b arranged therebetween.

Figure 6:
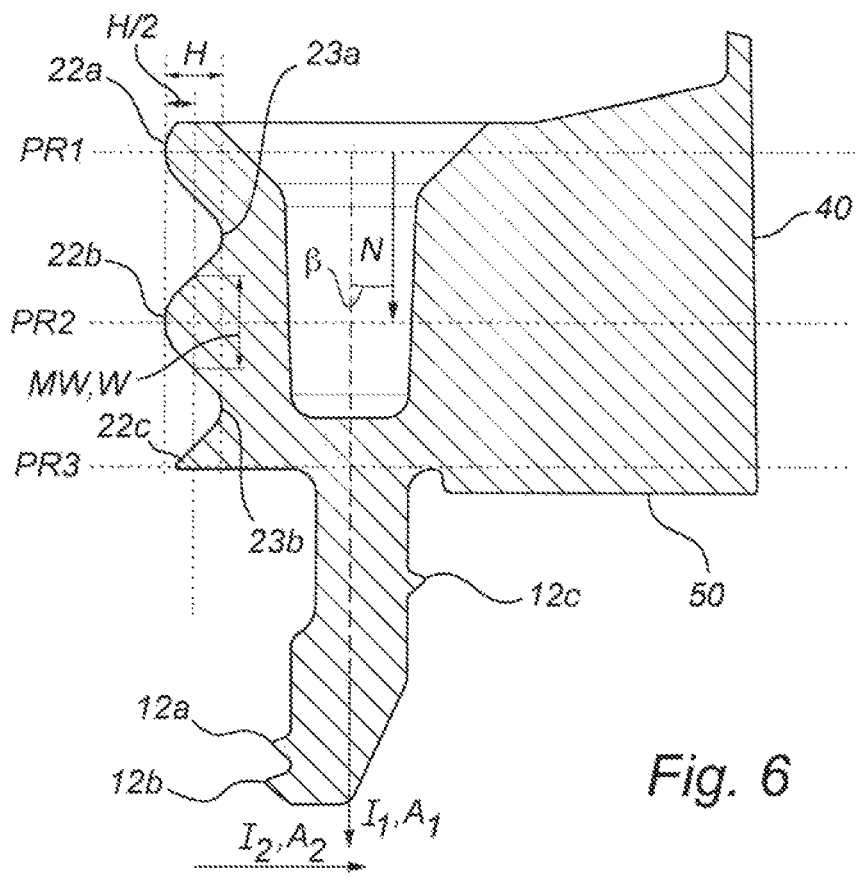

The height H is indicated in a cross-sectional view in FIG. 6. In the preferred embodiment the height H has the same value for all ridges 22a-c measured orthogonal to the length L at any given point along the length L. It may be noted that the height H may be different at different points along the length L for respective ridge 22*a-c*. This is e.g. indicated by the arrows H1 and H2 in FIG. 4 and FIG. 5, where e.g. height H1 may be greater than height H2 or vice versa. It may also be noted that the height H may be different for different ridges 22*a-c* at corresponding points along the length L. This is e.g. indicated by the arrows H1 and H3 in FIG. 4 and FIG. 5, where e.g. height H1 may be greater than height H3 or vice versa.

Figure 13:
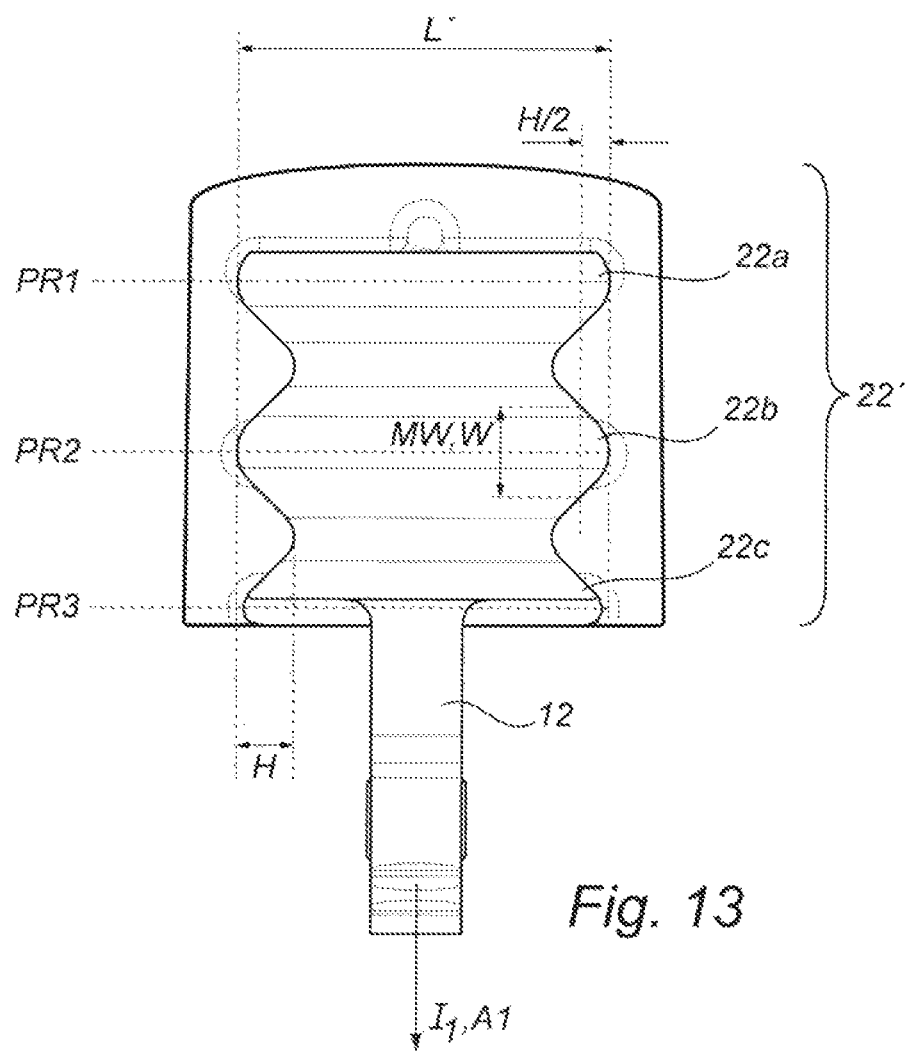
FIG. 13 is a top plan view of the second attachment part exemplified by an attachment arrangement according to the first embodiment.

It is preferred that the height H measured orthogonally to the length L is the same along the length L of respective ridge and also the same for all of the ridges, since this facilitates production of the second attachment part 22 of the attachment arrangement 10 and also facilitates the production of the recess 2*a*, 2*b* of the second furniture part 2. Typically, the respective recess 2*a*, 2*b* of the second furniture part 2 is produced by a milling operation whereby it is convenient to use a milling tool producing the profile of the valleys. Typically, the attachment arrangement 10 is casted or moulded and the tool used in such casting or moulding is conveniently produced using a milling operation. The length L is shown as extending along the curved path in FIG. 4. In FIG. 4, the ridge planes PR1, PR2, PR3 are parallel to the plane of the paper. In FIG. 13, the projection L' of the length L onto the plane of the paper of FIG. 13 is shown. The length L along the curved path is the active length, i.e. the length over which any force along the first axis A1 is transmitted between the second attachment part 22 of the attachment arrangement 10 and the second furniture part 2. It is preferred that the ridges 22*a-c* have the same active length L but it is conceivable that different ridges 22*a-c* have different active lengths L.

As shown in FIG. 13 and FIG. 6, the ridge planes PR1, PR2, PR3 have normals N extending in parallel, or at least essentially in parallel, with the first axis A1 at least when the first furniture part 1, the second furniture part 2 and the attachment arrangement 10 is in the assembled state. In this assembled state it is also conceivable that the ridge planes PR1, PR2, PR3 are slanted relative the first direction $I_1$ such that the normal N (pointing towards the first furniture part 1) forms and angle β with the first direction $I_1$ being smaller than 30°, preferably smaller than 10°, and as indicated above in the preferred embodiment the angle is 0°.

It may be noted that the ridge planes PR1, PR2, PR3 need not be parallel to each other. It is also conceivable that a single ridge follows a first ridge plane on one side of the second attachment part and another ridge plane (forming an angle with the first ridge plane) on the other side, thereby forming a V-shaped elongation (as seen in a plane to which the second axis is a normal). This may apply both for single ridge case and for a case with a plurality of consecutive ridges. As shown in the embodiments of FIGS. 6 and 13, the ridge planes PR1, PR2, PR3 are parallel to each other and the ridges 22*a-c* extend on both sides of the centre line.

Figure 14:
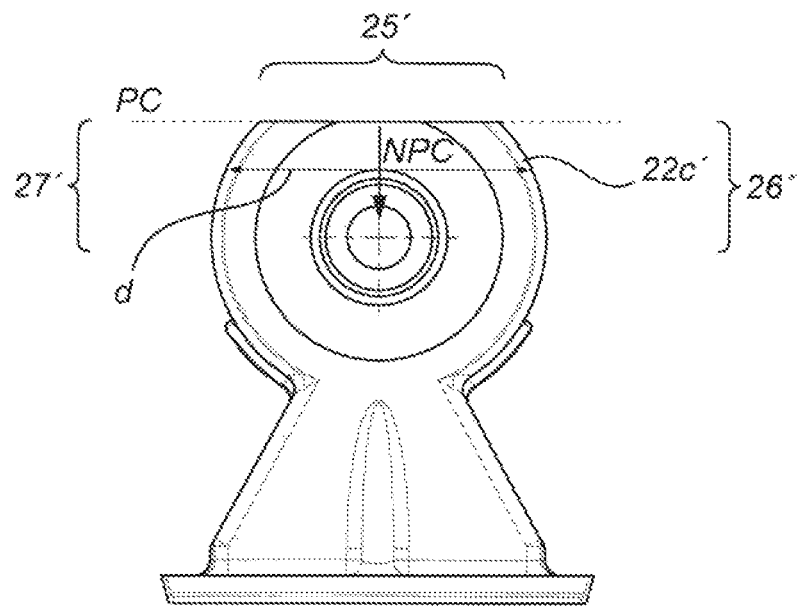
FIGS. 14 and 15 disclose alternative embodiments of the second attachment part exemplified as alternatives to the attachment arrangement according to the first embodiment.

In the embodiments shown in FIGS. 1-12 and FIGS. 16-23, the elongated ridges are formed on both top and side surfaces of the second attachment part 22. It may be noted that in the shown embodiments of FIGS. 1-12 and FIGS. 16-23, the top surface and side surfaces are in fact a continuous curved surface. In this context it may be noted that the top surface 25' is a part of the surface of the second attachment part 22 adapted to face the second furniture part 2 and the side surfaces 26', 27' are the parts of the surface adapted to extend from the top surface 25' in a direction having a component along the second insertion direction I2. It may be noted that there are numerous alternatives that may be used in this context. The surface of the second attachment part 22 may be broken into different segments having different curvatures. The surface of the second attachment part 22 may be broken into different segments extending along straight lines with different angles. Such designs are generally indicated by the two embodiments shown in FIGS. 14 and 15. In FIG. 14, the second attachment part 22 of the attachment arrangement 10 is basically formed in the same manner as in the embodiments in FIGS. 1-13 and FIGS. 16-23, but a top portion is cut away along a cutting plane PC. The cutting plane PC has in the shown embodiment its normal NPC in parallel to the second insertion direction $I_2$. It is conceivable that the normal NPC forms an angle with the second direction being smaller than 30°.

The attachment arrangement 10 is e.g. used to secure shelves 2 to the sidewalls 1 in a bookshelf, a wardrobe, a cupboard, or the like as indicated in FIGS. 1-3. In such an application, the sidewall of the bookshelf is typically the first furniture part 1 and the shelf is typically the second furniture part 2. The inside surface of the sidewall is typically provided with one or more recesses 1*a*, 1*b*, such as drilled holes, extending along the first axis A1, said first axis A1 being normal to the inside surface of the side wall. When the bookshelf is assembled and positioned in correct position for use, the first insertion direction is, hence, typically normal to the inside surface of the side wall, extends in a horizontal plane and is directed towards the surface of the side wall. The second direction is in the bookshelf application typically directed vertically downwardly. In such an application, the ridge plane is typically vertically oriented and in the preferred embodiments also parallel to the sidewalls.

As mentioned above, the bookshelf shown in FIGS. 1-3 is shown as being laid down onto its side with the sidewall 1 on a floor. This orientation is chosen to be able to show the different parts. When using the attachment arrangement 10 to attach furniture parts 1 and 2 to each other different orientations may be chosen.

It is e.g. conceivable that the frame of the furniture is assembled and positioned in an upright standing position with the sidewalls 1 extending vertically. The first insertion direction I1 would in such a case extend horizontally and the second insertion direction I2 would extend vertically downwardly.

It is also conceivable that the bookshelf is assembled and is kept laying with its backside 3 on the floor. The first insertion direction I1 would in such a case extend horizontally and the second insertion direction I2 would also extend horizontally, albeit orthogonally to the first direction I1.

It may be noted that the attachment arrangement 10 may be used for different kinds of applications where the orientation of e.g. the second direction or the ridge plane relative to gravity may be different than in the typical bookshelf application.

Figure 12:
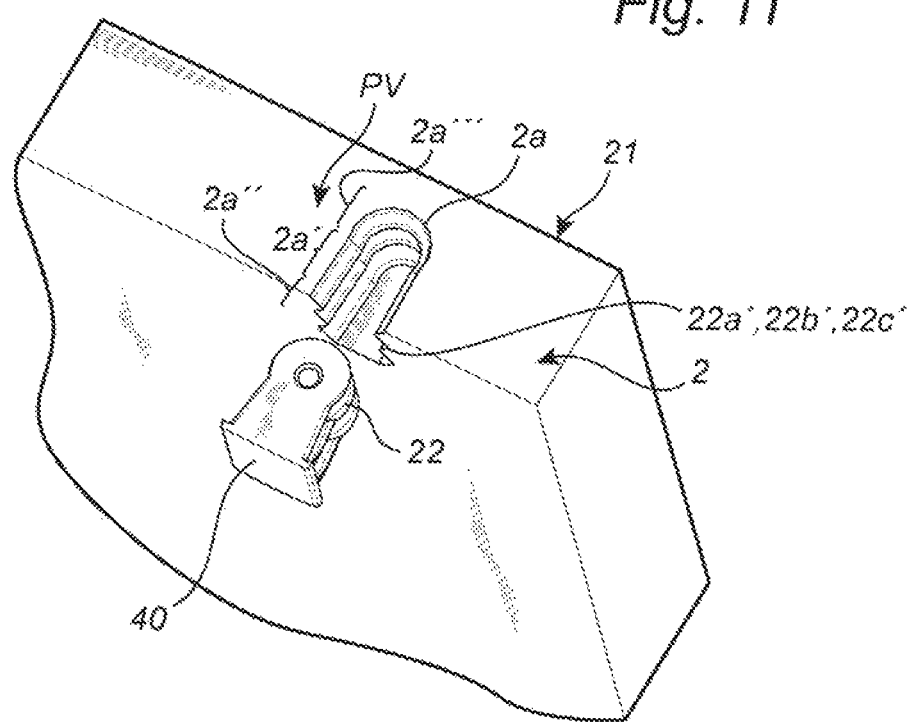
FIG. 12 is a detailed view of the recess in the first furniture part and an attachment arrangement exemplified by an attachment arrangement according to the second embodiment.

As shown in FIG. 12, the recess 2*a* in the second furniture part 2 does not extend all the way through the material. In the bookshelf application this means that the shelf 2 may be provided with a smooth upper surface 21. It may be noted that it is possible to design the second furniture part 2 such that the recess extends all the way through the material. It may be noted that in such a case, the feature "which top surface is adapted to face the second furniture part" is intended to be understood as the situation just before the second part of the attachment arrangement has been inserted into the recess in the second furniture part. It is e.g. conceivable to use an attachment arrangement 1 according to the embodiments of FIG. 14 or 15 with the cutting plane PC in flush with the upper surface of the shelf. In the first case above where the recess 2*a* does not extend all the way through the second furniture part 2, the top surface of the second attachment part 22 will face the second furniture part 2 both before and after being inserted into the recess 2*a*; before insertion the top surface will face the second furniture part as such and after insertion the top surface will face the inside surface of the recess of the second furniture part.

As shown in FIG. 12, the attachment recess 2*a* is provided with a waist 2*a*' separating an entrance part 2*a*" of the attachment recess 2*a* from a locking part 2*a*'" of the attachment recess 2*a*, wherein the second attachment part 22 is adapted for passing the waist 2*a*' upon being pressed thereagainst, and wherein the waist 2*a*' is adapted for holding the second attachment part 22 locked in the locking part 2*a*'" in accordance with snap-action function. The snap-in effect occurs when the second attachment part 22 passes the waist, see FIG. 12, and enters from the (lower) entrance part 2*a*" and up into the locking part 2*a*'" of the attachment recess 2*a*, as the waist 2*a*' has a more narrow cross-section, to be passed by the second attachment part 22, than the locking part 2*a*'".

As shown in the figures, see e.g. FIG. 6 and FIG. 13, each ridge has as seen in a plane perpendicular to the ridge plane PR1, PR2, PR3, a wedge shaped cross-section with its width W decreasing with increasing height H.

As shown in FIGS. 4 and 13, each ridge 22*a-c* has a length L such that a projection L' of the length L onto a plane (plane of the paper in FIG. 13) to which the second axis A2 forms a normal, is larger than, and preferably at least two times larger than, a maximum width MW of the ridge 22*a-c* as seen along the first axis A1, i.e. L'>MW, preferably L'=>2*MW. It may be noted in this context that the height H of a ridge is measured from the lowest point between two adjacent ridges to the highest point of respective ridge. This is shown in FIGS. 6 and 13. The width MW of one ridge 22*a-c* is measured from the point where the ridge falls down towards one valley at half the height H (i.e. H/2) of a ridge 22*a-c* to the other point on the other side of the ridge 22*a-c* where the ridge falls down towards one valley at half the height H (i.e. H/2). This is shown in FIG. 6 and FIG. 13.

As shown in FIG. 13, each ridge 22*a-c* has a length L, best shown in FIG. 4, such that a projection L' of the length onto a plane (plane of the paper of FIG. 13) to which the second axis A2 forms a normal is larger than, and preferably at least two times larger than, a maximum height H of the ridge 22*a-c*, i.e. L'>H, preferably L'=>2*H.

Figure 15:
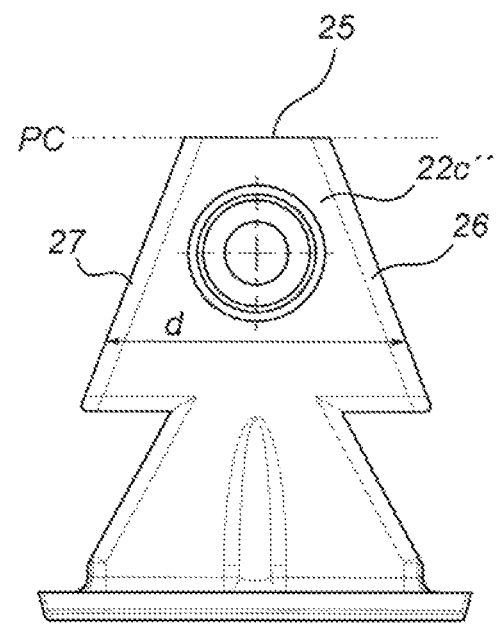

In all the embodiments, the side surfaces 26, 26', 27, 27' of the second attachment part 22 extend from the top surface 25, 25' in a direction having a component across the second axis in a direction adapted to face the recess of the second furniture part such that a distance d between the side surfaces increases with increased distance from the top surface. In FIG. 15, there is a distinct flat top surface 25 and straight side surfaces 26 and 27. In the embodiment of FIG. 15, the top surface 25 is not provided with ridges but it is contemplated that the top surface 25 may alternatively also be provided with ridges. The above is also true for a curved or partly circular design. If there is a ridge also on the top surface, each ridge will have along its length, in the ridge plane, a crest running along a curved or wedge shaped line such that a, along the length, a central portion 25' of the crest is located at a greater height than both side portions 26', 27' of the crest located, along the length, on either sides of the central portion. Such a design makes good use of the available surface providing a strong locking effect along the first axis and also provides a guiding effect not only associated with the shape of the side surfaces but also associated with the shape of respective ridge.

In the embodiments of FIGS. 1-13 and 16-23, the second attachment part 22 comprises a body part 22' having a portion of its surface being adapted to face the second furniture part and being formed as a convexly curved, preferably formed as a circular cylindrical portion with its central axis extending along the first axis A1, and with said at least one ridge running circumferentially on said convexly curved, preferably circular, cylindrical portion.

As shown in FIGS. 5, 6 and 13, the first attachment part 11 comprises according to one embodiment a pin 12. The pin 12 is fixedly attached to the second attachment part 12 and extends along the first axis A1. The pin 12 is insertable into said recess 1*a*, 1*b* in the first furniture part 1 by the relative motion between the first attachment part 11 and the first furniture part 1 in the first insertion direction $I_1$ in order to interact with an inside surface of the recess 1*a*, 1*b*.

In the embodiment shown in FIGS. 5, 6, and 13, the pin 12 is typically integrally formed with the second attachment part 22 and of the same material. The attachment arrangement 10 may e.g. be formed of a plastic material or of a metallic material. One suitable metallic material is e.g. Zamac. One suitable grade is e.g. Zamac 5. A suitable material may accordingly be a zinc-based alloy comprising about 94-96% zinc, about 3-5% aluminium, and optionally about 0.5-1.5% copper.

The pin may also be of another material (such as a metal pin, preferably a steel pin) than the second attachment part 22 and may be moulded into a plastic body forming other parts of the attachment arrangement. The pin may also be added at a later stage. In such a case the second attachment part may be provided with a body having a through-going hole adapted to receive a pin. The hole 29 may be circular or may be designed with internal grooves 29*a* extending along the centre line of the hole 29 in order to secure the pin at a specific rotational orientation. Such a hole 29 with internal grooves 29*a* is shown in the embodiment shown in FIGS. 9-11.

Figure 11:
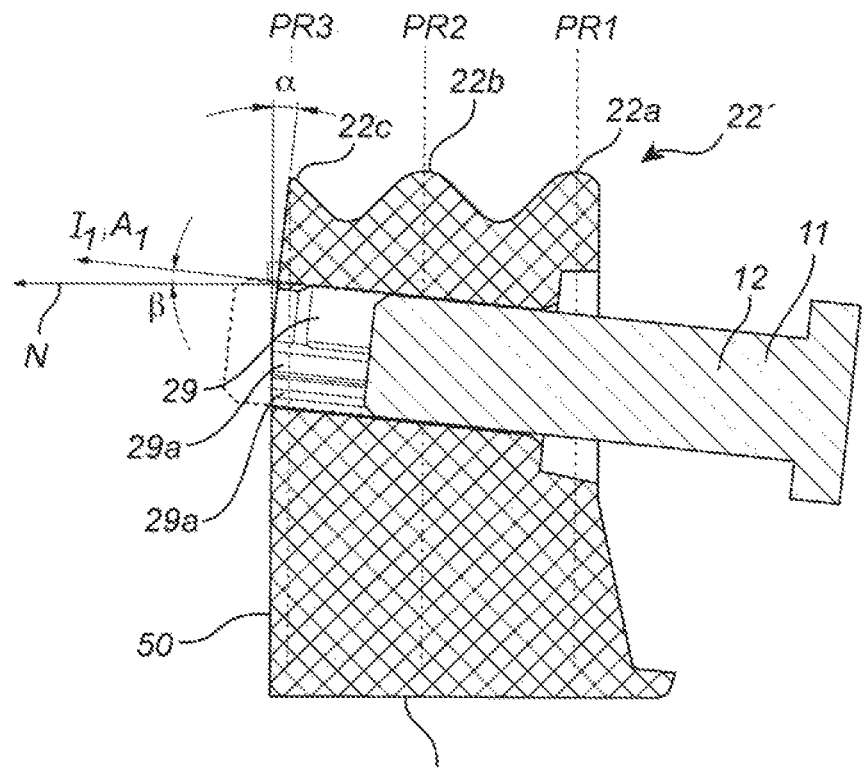

As shown in FIG. 11, the hole 29 may be inclined with the intention of orienting an insertable pin 12 at an angle α relative the second attachment part 22. The pin 12 may be provided partly inserted into the second attachment part 22 as shown in FIG. 11. This has the advantage that the user does not need to keep track of two pieces and there is no risk that the user inserts the pin 12 incorrectly into the second attachment part 22. The pin 12 may be provided partly inserted into the second attachment part 22 to such an extent that the tip extends a short distance out of the second attachment part 22 as indicated by the dashed lines in FIG. 11. This has the advantage that the user may easily position the attachment arrangement correctly relative to the first recess 1*a-b* in the first furniture part 1 before pushing or striking the pin with a hammer and thereby fully inserting the pin into the recess 1*a-b* of the first furniture part 1. As shown in FIGS. 5 and 6, the pin 12 may be provided with protrusions 12*a-c* extending across the first axis A1.

The protrusions 12*a-c* (FIG. 6), and/or the pin itself (e.g. FIG. 11, FIG. 17) may be oriented such that an angle α (see FIG. 11) of between 0.5-10°, preferably between 4-8°, less than or different from orthogonal is formed between the normal N and the second axis A2 when the pin 12 is inserted into the recess 1*a-b* in the first furniture part 1 and whereby installation of the second furniture part 2 forces the pin 12 to deform inside walls of the recess 1*a-b* in the first furniture part 1 such that the angle α becomes closer to 0° and the angle between the normal N and the second axis A2 comes closer to orthogonal, and preferably becomes orthogonal, when both the first and second furniture parts 1, 2 are installed. This provides a strong locking effect preventing the pin 12 from accidentally being pulled out of the recess 1a-b of the first furniture part 1. In the preferred embodiment, the angle α is about 5-7, most preferably 6°.

In an alternative to the embodiments in FIG. 6 and FIG. 11 discussed above, the first attachment part 11 may be an elongate member or pin 12 provided with a plurality of protrusions 12d-g. The protrusions 12d-g are in the embodiment disclosed in FIGS. 17-23 shown as circular rings around a stem. It may be noted that the circular rings 12d-g need not be fully continuous around the stem. As alternative to the rings, the protrusions 12d-g may be formed of one or more continuous or semi-continuous thread(-s) forming rings extending around the stem. As shown in FIGS. 17-23 and as e.g. shown in FIG. 19, at least one of the rings, and preferably all the rings, may have a forward sloping guiding surface 12g" and a rearward locking surface 12g'. The guiding surface 12g" has an increasing radial extension towards the second attachment part 22. The locking surface 12g' forms a distinct step thereby providing a locking effect. In the embodiment of FIGS. 17-23, the elongate member 12 has a main extension along a first axis $A_1$, which will also be along which axis $A_1$ and direction $I_1$ the elongate member 12 is inserted into the first furniture part 1. This main extension is in this embodiment angled at an angle β relative to the normal N of the ridge planes. The angle β is in this embodiment about 0.5-10°, preferably between 4-8°. This will in turn result in that an angle α of between 0.5-10°, preferably between 4-8°, different from orthogonal is formed between the normal N and the second axis $A_2$ when the elongate member 12 is inserted into the recess 1a-b in the first furniture part 1. Installation of the second furniture part 2 will force the elongate member 12 to deform the inside walls of the recess 1a-b in the first furniture part 1 such that the angle α, by which extensions of the normal N and the second axis $A_2$ differs from orthogonal, comes closer to zero and the normal N and second axis $A_2$ comes closer to orthogonal when both the first and second furniture parts 1, 2 are installed.

Figures 20A, 20B:
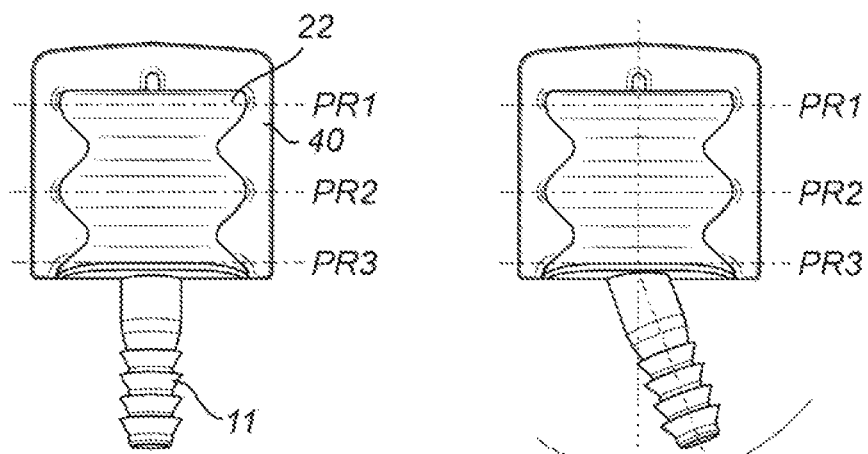
Figure 20C:
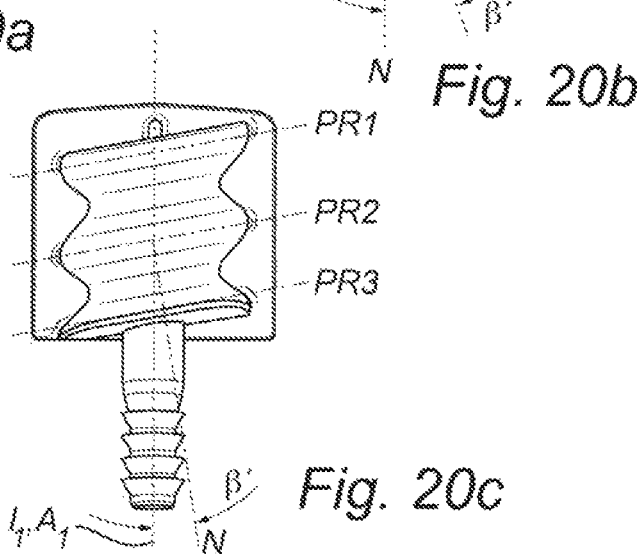
Figure 21:
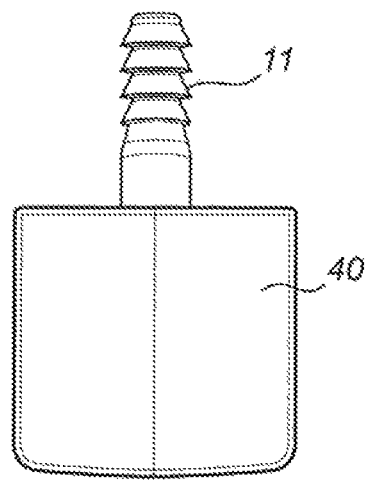
Figure 22:
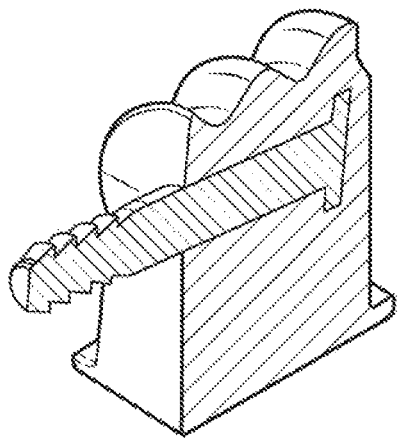

It may be noted that the angle between the insertion direction $I_1$ and the normal N to the ridge planes PR1, PR2, PR3 may not only be in the plane formed by the first and second directions $I_1$ and $I_2$, but may also as a complement or alternative be in a plane formed by the first direction I1 and a third direction orthogonal to the first and second directions. This plane would basically be the plane of the paper of FIG. 20b. In FIG. 20b it is shown how the longitudinal extension $I_1$, $A_1$ of the elongate member 12 is angled an angle β' of about 15° relative to the second attachment part 22 and thereby to the normal N of the ridge planes PR1, PR2, PR3. In FIG. 20c it is shown how the ridge planes PR1, PR2, PR3 are angled an angle β' of about 15° relative to the second attachment part 22 and thereby to the longitudinal extension $I_1$, $A_1$ of the elongate member 12. In the preferred embodiment shown in FIG. 20a, there is no angle β' between the first direction I1, A1 and the normal N of the ridge planes PR1, PR2, PR3. However, as discussed in relation to FIG. 19, there is an angle β in the plane defined by the first and second directions $I_1$, $I_2$.

Figure 7:
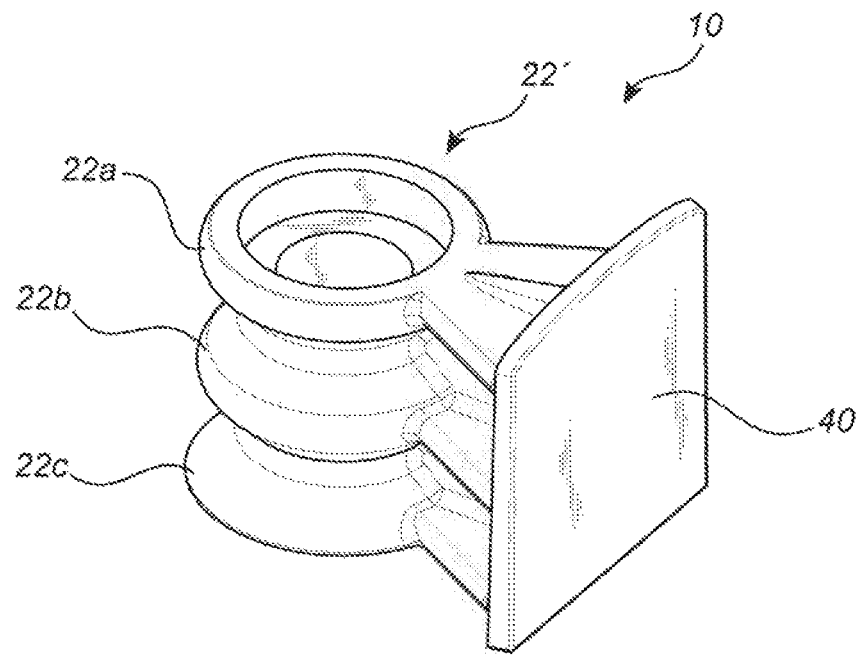
FIGS. 7-8 show an attachment arrangement according to a second embodiment.
Figure 8:
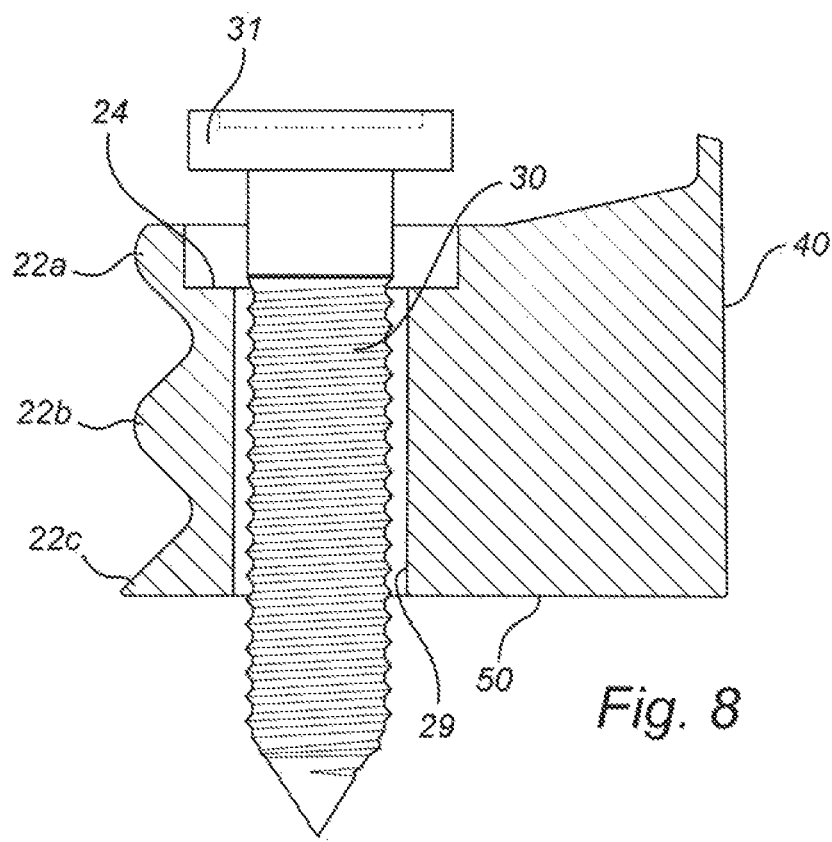
Figure 9:
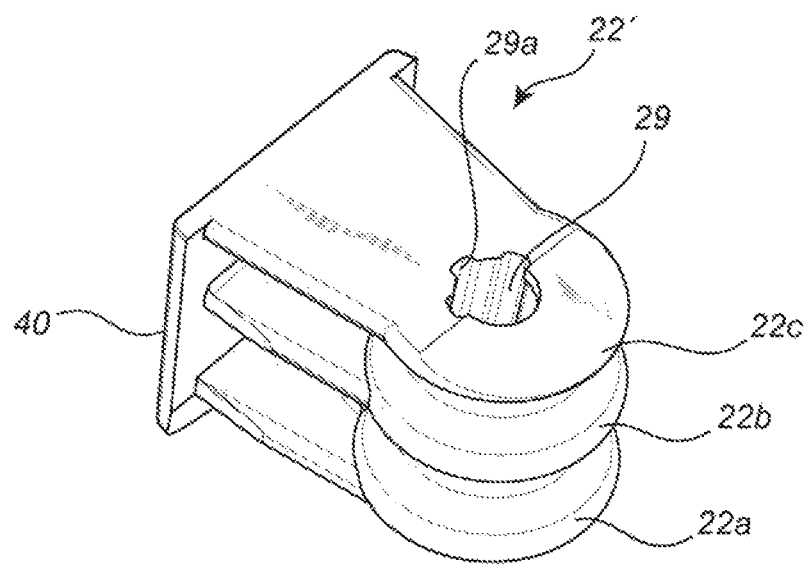
FIGS. 9-11 show an attachment arrangement according to a third embodiment.
Figure 10:
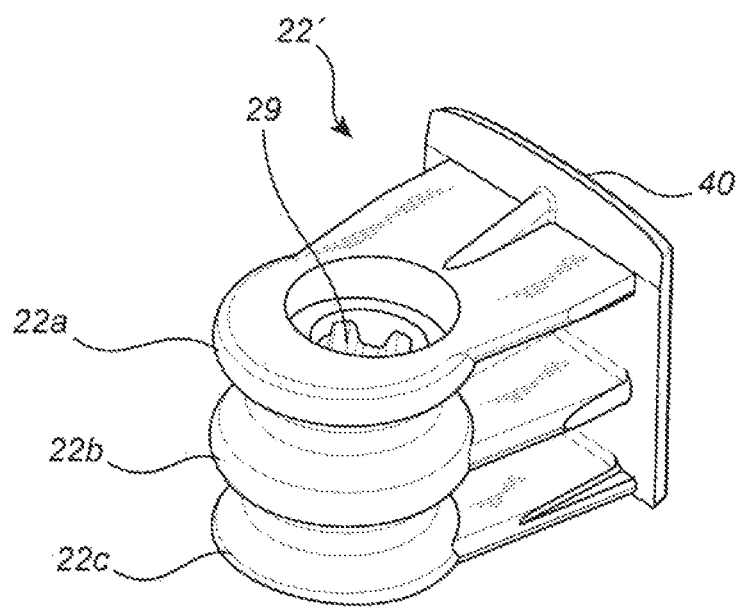

In the alternative shown in FIGS. 7 and 8, the second attachment part 22 is provided with a body 22' having a through-going hole 29 adapted to receive a screw 30, which screw 30 is adapted to interact, preferably threadingly interact, with an inside surface of the recess 1a, 1b and with the body 22' and to thereby force the body 22' into abutment with the first furniture part 1 thereby attaching the attachment arrangement 10 to the first furniture part 1. With such a design the fact that the screw is screwed into the recess 1a-b provides a strong locking effect preventing the attachment arrangement 10 from being removed from the first furniture part 1. The head 31 of the screw 30 is adapted to interact with an abutment portion 24 of the through-going hole 29.

The pin may be provided with one or more protrusions extending at least partly across the first axis and being adapted to interact with an inside surface of the thereby forming barbs counter-acting removal of the attachment arrangement 10 from the first furniture part 1. One example of such barbs are the protrusions 12a-c shown in FIG. 6 also having the effect of providing a specific orientation.

In the embodiment of FIG. 6, the protrusions 12a-c are distributed such that on a portion adapted to be located deeper inside the recess there is provided one or more protrusions or barbs 12a-b located only on that part of the circumference of the pin 12 which is adapted to face a direction opposite the second insertion direction $I_2$, and, on a portion adapted to be located closer to the mouth of the recess 1a-b, there is provided one or more protrusions or barbs 12c located only on that part of the circumference of the pin 12 which is adapted to face along the second insertion direction $I_2$. With this latter design, the pin will be forced into a locked position counter-acting removal when the second furniture part 2 is installed and also when the second furniture part 2 is loaded in the second direction A2, e.g. by supporting books, whereas the pin may still easily be removed from the first furniture part 1 during dismantling of the furniture. This latter may e.g. be useful if the user desires to change the vertical position of a shelf.

As shown in the figures, see for example FIGS. 3 and 5 and FIGS. 17-23, the attachment arrangement 10 is provided with a lower support member 40. The lower support member 40 is provided with an abutment surface 40a extending outwardly in a plane $P_{40}$ defined by the first direction I1 and a third direction I3 orthogonal to the first and second directions past a projection of the ridges 22a-c onto said plane $P_{40}$. Thereby an outer portion of the surface 40a along the perimeter of the support member 40 may abut the first furniture part 1 outside the respective recess 1a, 1b. The distance $D_{40a}$ between the top of the ridges 22a-c and the abutment surface 40a is preferably chosen such that any force onto the second furniture part 2, such as the weight of books or the like, is partly carried by the interaction between the second attachment part 22 and the inside of the recess 2a-b and partly carried by the interaction between the abutment surface 40a and the portions of the second furniture part 2 surrounding the recess 2a-b. The lower support member 40 is shaped as a cover plate 40 adapted to cover the recess 2a-b in the second furniture part 2 when the attachment arrangement 10 is inserted into the recess 2a-b of the second furniture part 2. Hence, the lower support member 40 may have the dual function of supporting the second furniture part 2 and of covering the recess 2a-b.

Figure 23:
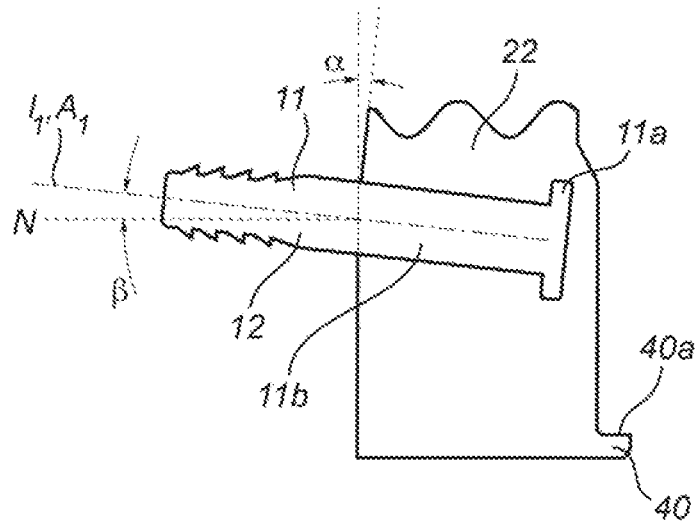

As shown in FIG. 23, the first attachment part 11 may be designed as a separate elongate member 12 moulded into the second attachment part 22, wherein the latter is preferably integrally formed with the lower support member 40. The first attachment part 11 may e.g. be made of a metal material which is moulded into a polymer material forming the second attachment part 22. The first attachment part 11 may be provided with a head 11a having a larger cross-section than the stem 11b thereby reducing the risk of accidental removal of the first attachment part 11 from the second attachment part 22.

The second furniture part 2 is provided with an attachment recess 2a-b having at least one elongate valley 22a-c' extending in a valley plane PV being parallel to the associated ridge plane PR1, PR2, PR3, the respective valley 22a'-c' being adapted to interact with an associated ridge 22a-c of the attachment arrangement 10 thereby counteracting relative motion between the attachment arrangement 10 and the second furniture part 2 along the first axis A1. This is indicated in FIG. 12. Basically all the features and discussions related to the ridges 22a-c of the attachment arrangement 10 may be transferred to the associated valleys 22a'-c' of the attachment recess 2a-b of the second furniture part 2.

Figure 16:
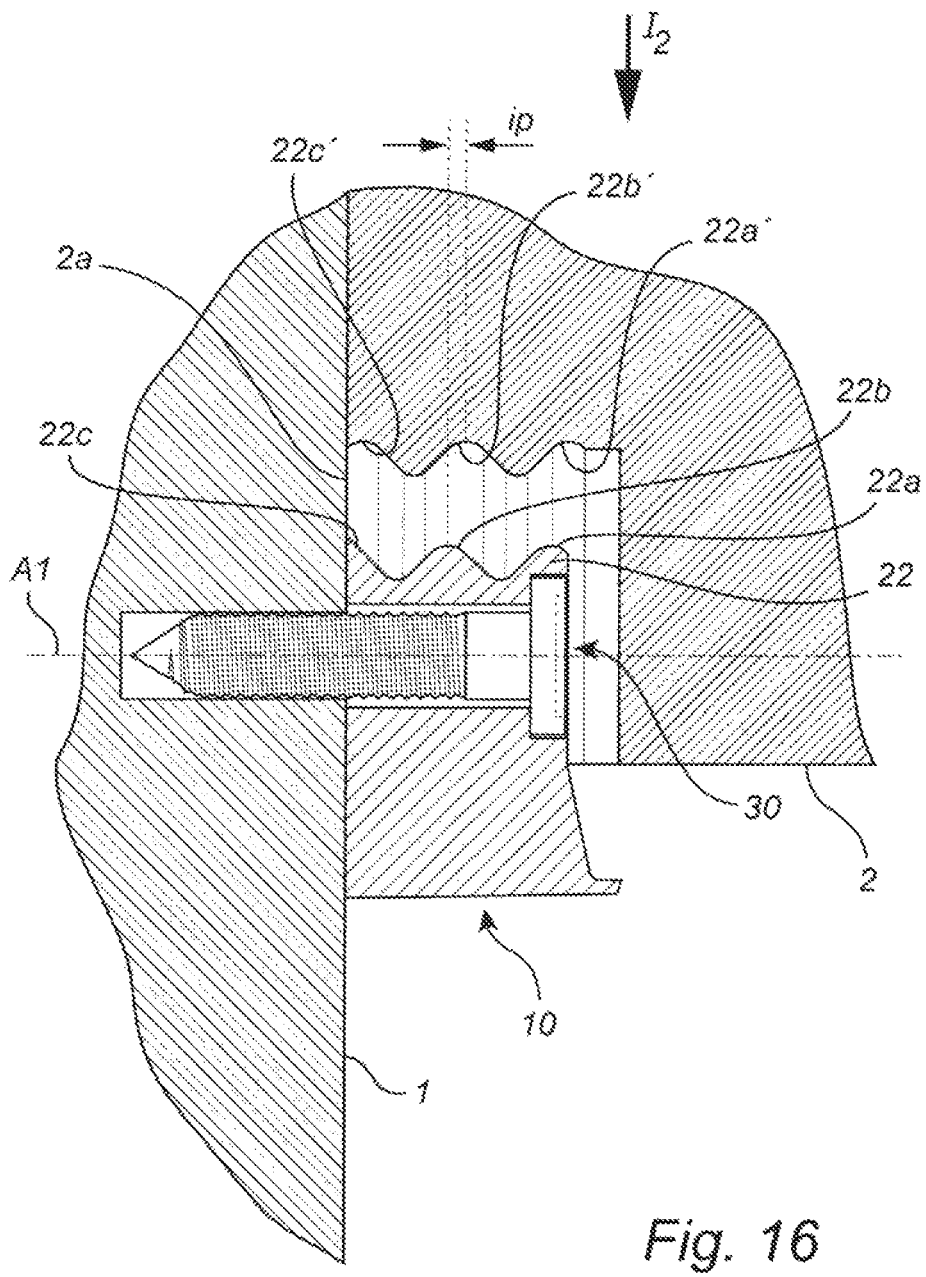
FIG. 16 shows attachment of a second furniture part to a first furniture part involving interference fit.
Figure 17:
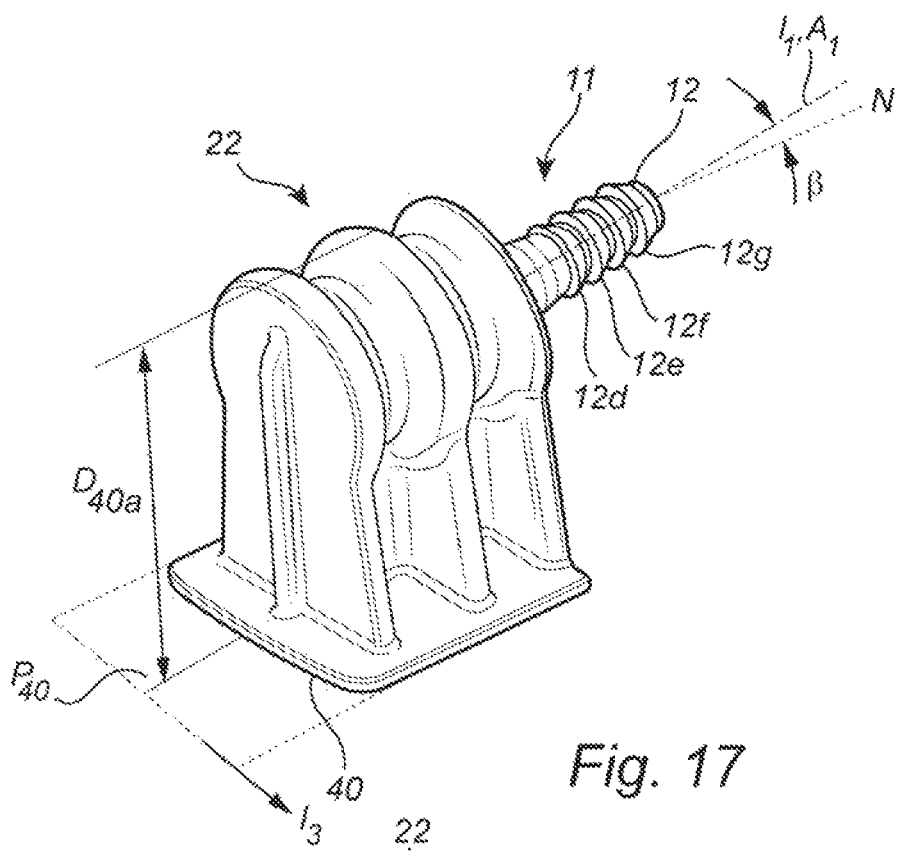
FIGS. 17-23 show an attachment arrangement according to a fourth embodiment and alternatives thereof in FIGS. 20b-20c.
Figure 18:
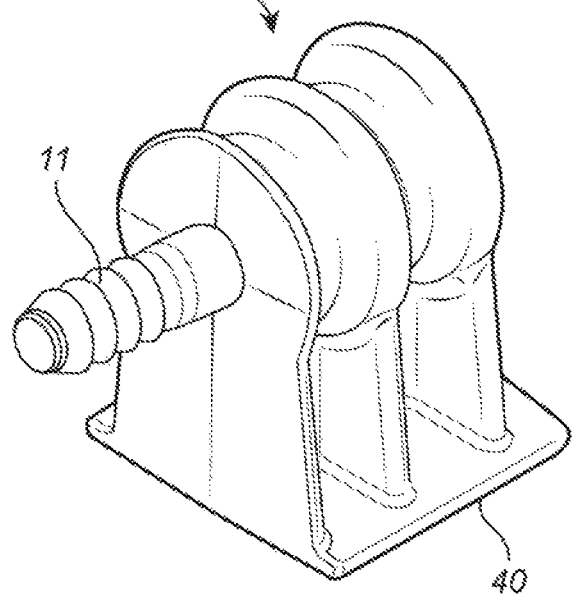
Figure 19:
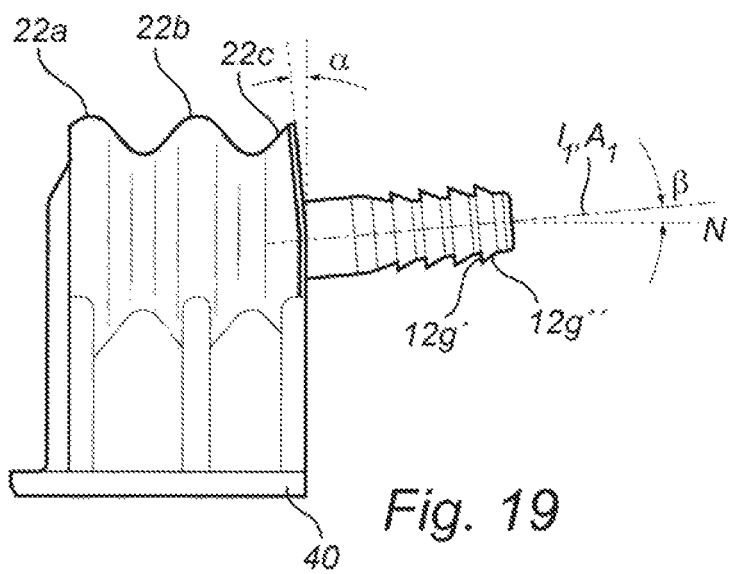

In one preferred embodiment, illustrated in FIG. 16, the ridges 22a-c of the attachment arrangement 10 are adapted to be positioned relative to the position of the valleys 22a'-c' of the second furniture part 2 and relative the position of an abutment portion 50 of the attachment arrangement 10 by which the attachment arrangement 10 abuts the first furniture part 1 such that the second furniture part 2 is forced into interference fit (ip) along the first axis A1 as the second attachment part 22 and the second furniture part 2 are moved towards each other along the second insertion direction $I_2$. The attachment recess 2a and the second attachment part 22 are adapted for, during mounting, to cause a sliding-in movement of said at least one ridge 22a-c of the attachment arrangement 10 into said at least one valley 22a'-c' of the attachment recess 2a of the second furniture part 2 to cause the second furniture part 2 to be pressed against the first furniture part 1 during mounting, such that said interference fit is achieved.

The invention claimed is:

1. Attachment arrangement adapted to connect a first furniture part to a second furniture part, the attachment arrangement comprising:
   a first attachment part adapted to be inserted into a recess in said first furniture part by a relative motion between the first attachment part and the first furniture part in a first insertion direction ($I_1$) extending along a first axis (A1), and
   a second attachment part adapted to be inserted into a recess in said second furniture part by a relative motion between on one hand the second furniture part and on the other hand the attachment arrangement in a second insertion direction ($I_2$) extending along a second axis (A2), the second axis (A2) having at least a major component orthogonal to the first axis (A1),
   wherein the second attachment part comprises at least one elongated ridge having a length (L) and a height (H) and extending in a ridge plane (PR1, PR2, PR3),
   wherein the ridge plane (PR1, PR2, PR3) has a normal (N) forming an angle ($\beta$, $\beta'$) to the first axis (A1), which angle is smaller than 30°,
   wherein said at least one elongated ridge is formed on a top surface or a side surface, or on both the top and side surfaces of the second attachment part, which top surface is adapted to face the second furniture part and which side surfaces are adapted to extend from the top surface in a direction having a component which is parallel with the second insertion direction ($I_2$),
   wherein the first attachment part is configured to be inserted into the recess in said first furniture part allowing the second attachment part to maintain its orientation about the first axis (A1) during the insertion of the first attachment part in the recess: wherein the first attachment part comprises an elongate member extending along the first axis (A1), wherein the elongate member is insertable into said recess in said first furniture part by said relative motion between the first attachment part and the first furniture part in the first insertion direction ($I_1$) in order to interact with an inside surface of the recess, and
   wherein the elongate member is oriented relative the second attachment part or provided with protrusions extending across the first axis (A1), or both the elongate member is oriented relative the second attachment part and provided with protrusions extending across the first axis (A1), such that an angle ($\alpha$) different from orthogonal is formed between the normal (N) and the second axis (A2) when the elongate member is inserted into the recess in the first furniture part and whereby installation of the second furniture part forces the elongate member to deform inside walls of the recess in the first furniture part such that the angle between the normal (N) and the second axis (A2) comes closer to orthogonal when both the first and second furniture parts are installed.

2. Attachment arrangement according to claim 1, wherein the second attachment part is allowed to maintain its orientation about the first axis (A1)
   by the elongate member being oriented relative the second attachment part and/or provided with protrusions extending across the first axis (A1) such that an angle different from orthogonal is formed between the normal (N) and the second axis (A2) when the elongate member is inserted into the recess in the first furniture part and whereby installation of the second furniture part forces the elongate member to deform inside walls of the recess in the first furniture part such that the angle between the normal (N) and the second axis (A2) comes closer to orthogonal when both the first and second furniture parts are installed, and/or
   by the second attachment part being provided with a body having a through-going hole adapted to receive a screw or pin.

3. Attachment arrangement according to claim 1, wherein the elongate member is fixedly attached to the second attachment part.

4. Attachment arrangement according to claim 1, wherein the second attachment part is provided with a body having a through-going hole adapted to receive a screw, which screw is adapted to interact with an inside surface of the recess and with the body and to thereby force the body into abutment with the first furniture part thereby attaching the attachment arrangement to the first furniture part.

5. Attachment arrangement according to claim 1, wherein the attachment arrangement is provided with a lower support member adapted to abut the second furniture part, preferably to abut a lower surface of the second furniture part, thereby aiding said at least one elongated ridge to support the second furniture part relative to the first furniture part.

6. Attachment arrangement according to claim 5, wherein the lower support member is formed as a cover plate adapted to cover the recess in the second furniture part when the attachment arrangement is inserted into the recess of the second furniture part.

7. Attachment arrangement according to claim 1, wherein the second attachment part comprises a plurality of consecutive elongate ridges, wherein each elongate ridge has a length (L) and height (H) arranged in an associated ridge plane (PR1, PR2, PR3), wherein each such ridge plane has a normal (N) forming an angle to the first axis (A1), which angle is smaller than 30°, and wherein the ridge planes are arranged successively one after another along the first axis (A1), whereby along the first axis there is formed a set of consecutive ridges being separated by valleys arranged therebetween.

8. Attachment arrangement according to claim 7, wherein the ridge planes (PR1, PR2, PR3), each being associated with a respective ridge of said plurality of said consecutive elongate ridges, are parallel to each other.

9. Attachment arrangement according to claim 1, wherein the each ridge plane (PR1, PR2, PR3) has a normal (N) forming an angle to the first axis (A1), which angle is smaller than 10°.

10. Attachment arrangement according to claim 1, wherein each ridge has, as seen in a plane perpendicular to the ridge plane (PR1, PR2, PR3), a wedge shaped cross-section with its width (W) decreasing with increasing height (H).

11. Attachment arrangement according to claim 1, wherein each ridge has a length (L) such that a projection (L') of the length (L) onto a plane to which the second axis (A2) forms a normal is larger than, and preferably at least two times larger than, a maximum width (MW) of the ridge as seen along the first axis (A1).

12. Attachment arrangement according to claim 1, wherein each ridge has a length (L) such that a projection (L') of the length (L) onto a plane to which the second axis (A2) forms a normal is larger than, and preferably at least two times larger than a maximum height (H) of the ridge.

13. Attachment arrangement according to claim 1, wherein the side surfaces are adapted to extend from the top surface in a direction having a component being perpendicular to the second axis (A2), the distance (d) between the side surfaces increasing with increased distance from the top surface.

14. Attachment arrangement according to claim 1, wherein each ridge has along its length (L), in the ridge plane (PR1, PR2, PR3), a crest running along a curved or wedge shaped line such that a, along the length (L), a central portion of the crest is located at a greater height than both side portions of the crest located, along the length (L), on either sides of the central portion.

15. Attachment arrangement according to claim 1, wherein the second attachment part further comprising a body part having a portion of its surface being adapted to face the second furniture part and being formed as a convexly curved, preferably formed as a circular cylindrical portion with its central axis extending along the normal direction (N), and with said at least one ridge running circumferentially on said convexly curved, preferably circular, cylindrical portion.

16. A piece of furniture comprising a first furniture part, a second furniture part and an attachment arrangement according to claim 1.

17. A piece of furniture according to claim 16, wherein the second furniture part is provided with an attachment recess having at least one elongate valley extending in a valley plane (PV) being parallel to the associated ridge plane (PR1 PR2, PR3), the respective valley being adapted to interact with an associated ridge of the attachment arrangement thereby counteracting relative motion between the attachment arrangement and the second furniture part along the first axis (A1).

18. A piece of furniture according to claim 17, wherein said at least one ridge of the attachment arrangement is adapted to be positioned relative to the position of said at least one elongate valley of the second furniture part and relative the position of an abutment portion of the attachment arrangement by which the attachment arrangement abuts the first furniture part such that the second furniture part is forced into interference fit (ip) along the first axis (A1) as the second attachment part and the second furniture part are moved towards each other along the second insertion direction ($I_2$).

19. A piece of furniture according to claim 18, wherein the attachment recess and the second attachment part are adapted for, during mounting, to cause a sliding-in movement of said at least one ridge of the attachment arrangement into said at least one valley of the attachment recess of the second furniture part to cause the second furniture part to be pressed against the first furniture part during mounting, such that said interference fit (ip) is achieved.

20. A piece of furniture according to claim 16, wherein the attachment recess is provided with a waist separating an entrance part of the attachment recess from a locking part of the attachment recess, preferably the second attachment part being adapted for passing the waist upon being pressed thereagainst, the waist being adapted for holding the second attachment part locked in the locking part in accordance with snap-action function.

21. Attachment arrangement according to claim 1, wherein the angle (α) is between of between 0.5-10°.

22. Attachment arrangement according to claim 1, wherein the angle (α) is between 4-8°.

23. Attachment arrangement according to claim 1, wherein the ridge plane (PR1, PR2, PR3) has a normal (N) forming an angle to the first axis (A1), which angle is 0°.

* * * * *